March 31, 1942.  O. J. GOERING  2,278,173
FLASHLIGHT CAMERA
Filed April 20, 1939  3 Sheets-Sheet 1
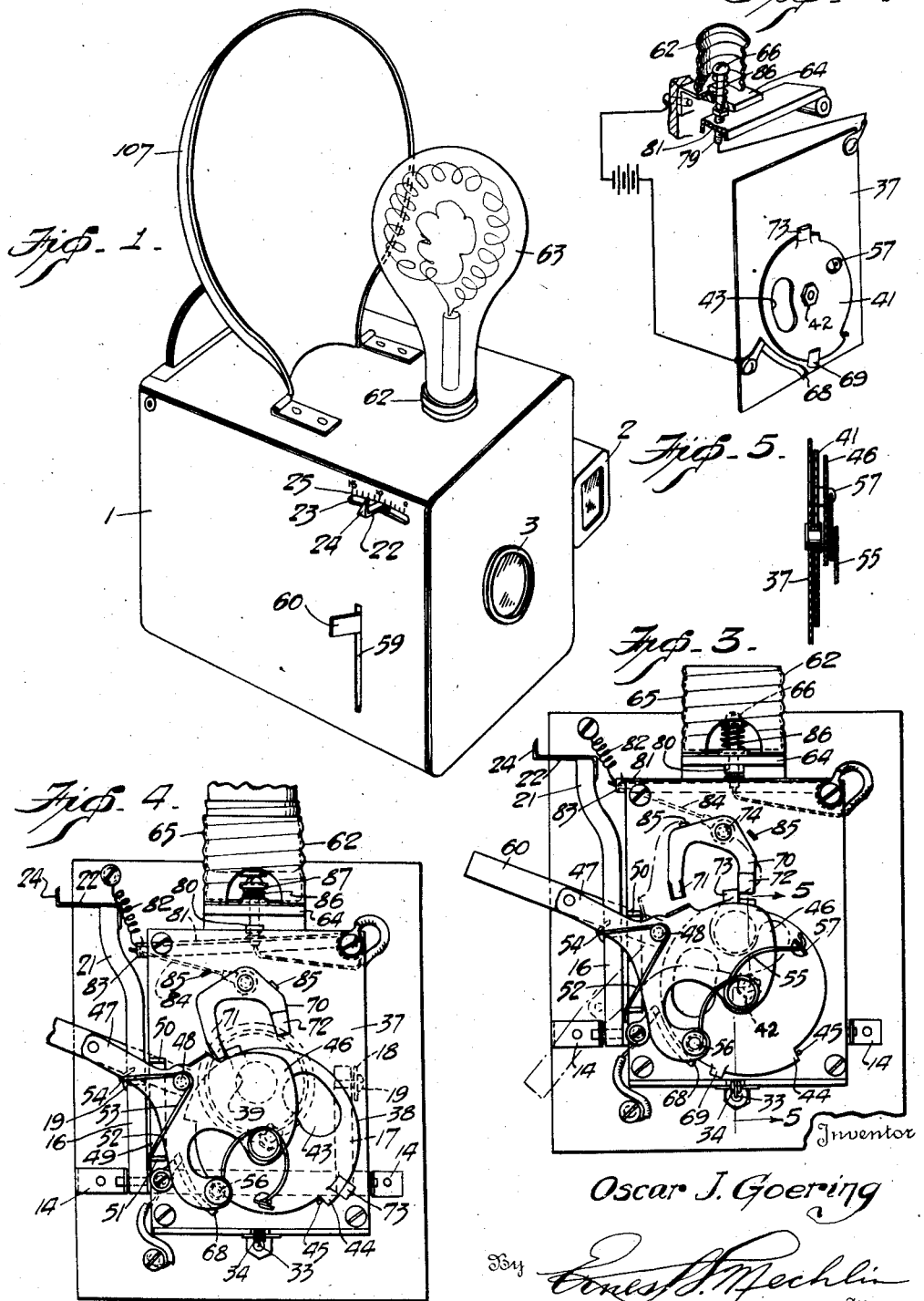
Inventor
Oscar J. Goering March 31, 1942.  O. J. GOERING  2,278,173
FLASHLIGHT CAMERA
Filed April 20, 1939  3 Sheets-Sheet 2
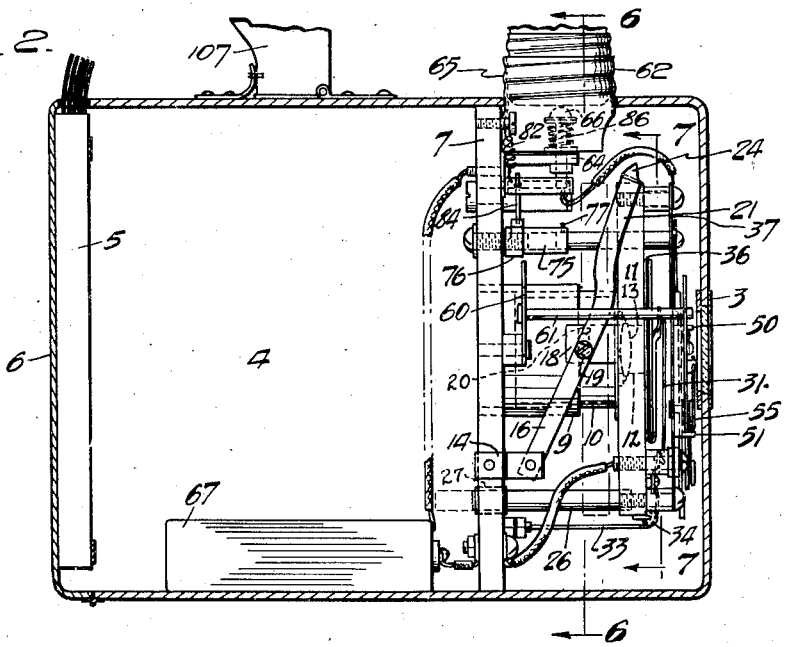
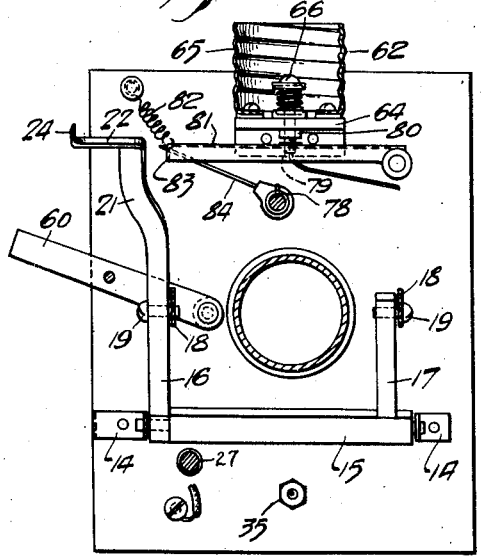
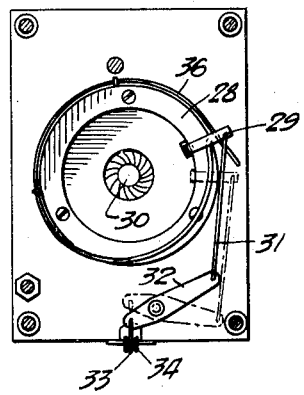
Inventor
Oscar J. Goering
By Ernest S. Mechlin
Attorney

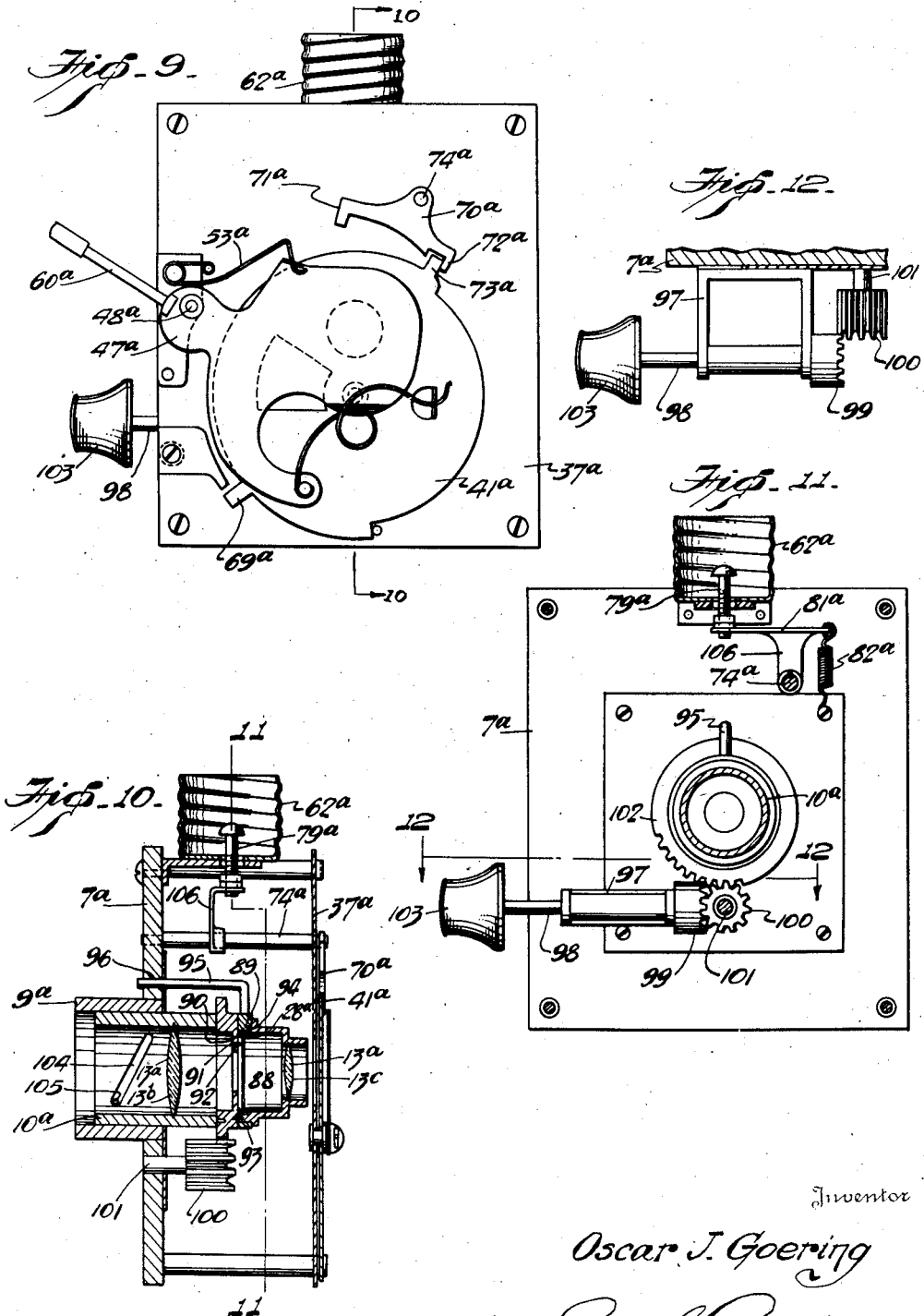

Patented Mar. 31, 1942

2,278,173

UNITED STATES PATENT OFFICE 2,278,173

FLASHLIGHT CAMERA

Oscar J. Goering, Lansdale, Pa.

Application April 20, 1939, Serial No. 269,002

5 Claims. (Cl. 67—29)

The invention, generally considered, relates to cameras and more especially to flashlight cameras which are particularly designed for taking photographs under adverse light conditions by utilizing the light emitted on ignition by a flash bulb.

For many years photography by artificial light was a field limited to professional cameramen and those few amateurs having both the skill and means required for the pursuit of this exacting hobby. The difficulty lay principally in the provision of means for throwing sufficient light on the subject being photographed to permit proper exposure of the film in the camera. The available sources of light were flood lamps, several of which were usually required, and flash powders which, when fired, produced a brilliant light. However, neither flood lamps nor flash powders were entirely satisfactory. The former were necessarily so cumbersome that their utility was limited to the taking of carefully posed photographs. Flash powders were of wider application, but each charge had to be measured to insure uniformity of light and the firing of the powder was followed by a cloud of smoke which interfered with the taking of subsequent pictures. In addition, there was the ever present danger that the photographer might be severely burned.

A few years ago the light problem was finally solved by the development of a bulb which, while similar in outward appearance to an ordinary light bulb, is packed with aluminum foil or a similar material which oxidizes rapidly and emits, during oxidation, an intensely brilliant light. Such bulbs, known variously as flash, photo-flash, and flash-light bulbs, are compact, eliminate both the smoke and danger of burning attendant the use of flash powder, produce a light of uniform intensity, and are readily ignited by a small battery. The development of the photo-flash bulb, together with the tremendous increases in recent years in the emulsion speeds of standard film, make it possible to produce, at low cost, cameras which satisfactorily photograph subjects under artificial light. Consequently, the average camera owner of moderate means is now able to invade the field formerly occupied only by the expert.

Coincident with the entrance of the average individual into night and related photography, the manufacturer of cameras was confronted with new problems. The average person does not have the time nor is he inclined to master thoroughly all the details of camera technique. At the same time he expects to be able to take reasonably good pictures with his camera. To enable him to do so, the manufacturer must endeavor to make his camera as fool-proof as possible without material increase in its cost. One of the main sources of grief has been the loss of photo-flash bulbs because of the lack of synchronism between the flash of the bulb and the exposure of the film. Accordingly, numerous methods have been devised for correlating the movement of the camera shutter with the ignition of the bulb to prevent such loss. However, there are other trouble spots of equal importance in the taking of good pictures which have not heretofore been eliminated. One of these is the accidental operation of the shutter when the camera is not loaded with an unfired flash bulb, resulting in either double exposure or total loss of the exposed film. Another is the failure to adjust the aperture of the lens to compensate for variations in the light thrown on objects at different distances from the camera. In daylight photography adjustment of the aperture is frequently overlooked even when the light is very evidently changing, causing either over-exposure or under-exposure of the film. It is thus to be expected that, in night photography where the light is apparently constant, the size of the aperture will often be forgotten. Actually, the aperture adjustment is much more important in night photography since the proximity of the source of light produces pronounced variations in the light thrown on different objects, depending upon the distances of those objects from the light source.

It is with the above facts in mind that the present invention was consummated, the primary object of which is to provide a camera wherein the sources of trouble heretofore existent in flashlight cameras are practically eliminated, thereby facilitating the photographing of objects by artificial light.

Another object of the invention is to provide a flashlight camera in which the focusing of the lens on an object will automatically adjust the lens aperture to compensate for variations in the intensity of the light at different distances from the light source.

A further object of the invention is to provide means for locking the shutter of a flashlight camera against movement to prevent the operation of the shutter except when the camera is loaded with an unfired flash bulb.

A further object of the invention is to provide a flashlight camera which, while self-contained, is compact, inexpensive both in construction and operation, simple in operation, and capable of taking satisfactory photographs.

To the attainment of the foregoing and other objects, the invention preferably consists in the arrangements and combinations of parts to be hereinafter more fully described, particularly pointed out in the appended claims, and illustrated in the accompanying drawings in which:

Figure 1 is a perspective view of a camera embodying the present invention.

Figure 2 is a side elevational view of the camera with the side of the shell removed to more clearly show the operative parts thereof.

Figure 3 is a front elevational view of the operating mechanism of the camera in normal position, the position of the actuating arm in shutter operating position being shown diagrammatically.

Figure 4 is a front elevational view of that portion of the camera shown in Figure 3, showing the relationship between the various parts of the operating mechanism after clockwise rotation of the shutter.

Figure 5 is a view taken along the lines 5—5 of Figure 3, looking in the direction of the arrows.

Figure 6 is a view taken along the lines 6—6 of Figure 2, looking in the direction of the arrows, disclosing the construction of the focusing means.

Figure 7 is a view taken along the lines 7—7 of Figure 2, looking in the direction of the arrows, in which is shown the aperture controlling mechanism.

Figure 8 is a perspective view of portions of the camera, showing the electrical circuit and the relation between the shutter and the bulb socket with respect to the circuit.

Figure 9 is a front elevational view of a modified form of operating mechanism.

Figure 10 is a vertical sectional view taken along lines 10—10 of Figure 9, looking in the direction of the arrows, to show the details of the lens controlling mechanism.

Figure 11 is an elevational view taken along lines 11—11 of Figure 10, looking in the direction of the arrows.

Figure 12 is a plan view taken along lines 12—12 of Figure 11, looking in the direction of the arrows, showing the details of the actuating gears.

Referring now in detail to the drawings wherein like reference characters indicate like parts, and particularly to Figures 1 through 8, the preferred embodiment of the invention is illustrated as applied to a box camera. The numeral 1 designates the shell, housing or frame of the camera, 2 an optical sight or view finder attached to the frame, and 3 an opening in the front end of the camera through which the light reflected from the subject being photographed enters the camera.

Occupying the rear portion of the interior of the camera is a light chamber or compartment 4 in which film is both housed and exposed. Although provision can readily be made for loading the camera with any form of film, a film pack 5 is herewith employed. The film pack is carried on the back or rear wall 6 of the camera which closes the rear end of the compartment and means are provided for holding or positioning each film in the pack on a plane fixed relative to the rear wall for the duration of its exposure. For convenience the back is formed as a hinged part of the shell to permit access to the film chamber.

The front end of the film chamber is closed by a panel, partition or base board 7, which fits snugly against the surrounding housing and separates the chamber from the operating mechanism to which the present invention relates. On the outer face of the base board is carried a collapsible or telescopic lens tube 8 comprising an outer tube or conduit 9 which projects through and is rigidly attached to the base board adjacent the central portion thereof, and an inner tube 10. The latter, which is positioned within and adapted to slide relative to the conduit, is yet of sufficient diameter to provide a light-tight lens tube without impairment of the ability of the tube to telescope. The front end of the inner tube is affixed or secured to a lens board or mount 11, having a lens opening 12 in which a lens or objective 13 is mounted in axial alinement with the lens tube. If an objective having a greater light transmitting power than the single lens shown is desired the additional lenses can be mounted in the lens board and the inner tube.

A telescopic lens tube is here provided to prevent the entrance of light into the film chamber 4 from a source other than the objective on movement of the lens mount relative to the lens board in process of focusing the lens. The images of objects at different distances from the objective are not projected on one plane but on a multiplicity of planes, the distances of which from the lens vary inversely as the distances from the lens to their objects. For maximum clarity or sharpness of definition, the projected image and the film or light sensitive plate on which it is to be recorded must coincide. Since films during their exposure are all held on the same fixed plane in the film chamber, which for convenience will be called the image plane, it is thus necessary to focus the lens on the image plane irrespective of the distance of the object from the lens.

Focusing of the lens can be readily accomplished by the provisions of means for moving the lens board in which the lens is mounted relative to the base board. For this purpose a pair of transversely spaced bearing members 14 are mounted on the base board. Extending between and rotatably associated with the bearings is an axle forming beam 15. Adjacent its opposite extremities the beam is provided with a number of upwardly extending lever arms 16 and 17 which are substantially parallel throughout a portion of their length. Attached to or mounted on the inner surface of the lens board are a pair of spaced brackets 18 which are substantially in horizontal alinement with the axis of the lens tube 8. To these brackets the lever arms are pivotally and slidably attached by suitable means as by the pins 19 secured to the lever arms which are slidably received in corresponding vertically extending slots 20 in the brackets. One of the arms 16 is provided with an extension 21 adjacent the upper end of which is an angularly disposed rod or portion 22 which projects outwardly of the adjacent side of the shell 1 through an appropriate slot 23 to permit actuation of the lever and consequent movement of the lens board when focusing the lens. The extremity of the extension forms a pointer or indicating means 24 for which a graduated scale 25 is provided on the outside of the shell in order that the correct position of the lens for objects at different distances may be determined by inspection.

Movement of the lens on actuation of the lever arm is limited in one direction by the abutment of the outer tube 9 against the lens board. Outwardly of the base board, the movement of the lens is conveniently limited by the engagement of the pins 19 to the bottom walls of the slots 20 in the brackets. To prevent binding of the lens tube and aid in guiding the travel of the lens board one or more guide members 26 are affixed to the lens board and adapted to slide in conforming guideways 27 in the base board.

Attached to the lens board on the side opposite the lens tube and positioned over the lens opening is an iris diaphragm 28 of the usual type having a projecting actuating bar 29. By movement of the bar the iris opening 30 of the diaphragm can be adjusted and the aperture of the lens changed, whereby the extent of the exposure of films can be controlled. Ordinarily the focusing of a camera on an objective to be photographed and the adjustment of the lens aperture for correct exposure are separate operations which are controlled by independent factors.

Of particular importance in the present invention are the means whereby the formerly separate operations are combined and the correct lens aperture automatically obtained on focusing of the camera.

Adjustment of the lens aperture in daylight photography is dependent primarily upon light conditions on a particular day, the distance of the object being photographed from the lens being important only in determining the depth of focus obtainable with a particular lens. In night and related photography, on the contrary, the distance of the object is the controlling factor since the proximity of the source of artificial light is such that the law of inverse square is determinative of the intensity of the light. By attaching the artificial light source to the camera the light thrown on a particular object will vary inversely as the square of the distance of that object from the camera. It is also known that the distance of the plane on which the image is focused from the lens is equal to the product of the focal length ($f$) of the lens times the distance (D) of the object from the lens divided by the difference between the distance of the object and the focal length of the lens (image distance=$Df/D-f$). If the other variables are eliminated by the use with a camera having a constant shutter speed of bulbs of a given intensity, and film of a particular emulsion speed, it is then possible to correlate the movement of the lens with that of the iris diaphragm and the diaphragm can be so coupled to the lens that the focusing of the lens will automatically correct its aperture.

In the coupling means shown in Figures 2 and 7 the actuating bar 29 is connected by a link 31 to one arm of a lever 32 of predetermined length which is pivotally mounted on the lens board. To the other arm of the lever is attached one end of a flexible cable 33 which rides in the peripheral groove of a floating wheel or pulley 34 mounted at the base of the lens board. The other end of the cable is adjustably secured to the base board by suitable means such as the illustrated bolt arrangement 35. The use of a flexible cable permits actuation of the diaphragm through the cable only on movement of the lens board outwardly relative to the base board and it is therefore necessary to provide a suitable spring 36, one end of which is anchored to the lens board and the other to the actuating bar, which acts to maintain the cable taut and urges the diaphragm toward normal or closed position on reverse movement of the lens board. If it is desired to adapt the camera for use with other bulbs or film than those for which it was designed, this may be accomplished by the replacement of the lever 32 with a substitute lever having arms of the length required for the new setting.

Spaced outwardly of the diaphragm side of the lens board a sufficient distance to permit unrestricted adjustment of the iris diaphragm is a base plate 37 of the shutter mechanism which is indicated as a whole by the numeral 38. The plate is attached or secured to the lens board by any suitable means and has an exposure aperture 39 axially alined with relation to the objective 13. The aperture in the plate is normally covered by a shutter or disk 41 which is rotatably mounted on the outer face of the plate through the bearing 42. In the shutter is provided an orifice 43 which is adapted to cross and uncover the aperture 39 on rotative movement of the shutter to permit exposure of the film in the film chamber 4. The rotative movement of the shutter in either direction is limited by movement of one of the pair of projecting shoulders 44 adjacent the periphery of the shutter and a pin or stop 45 upstanding from the face of the base plate.

Partly overlying the shutter and normally covering the aperture in the base plate is a cover plate 46 forming a part of the shutter actuating member or arm 47 which is pivotally attached to the base plate at 48. Interposed between the actuating arm and the base plate is a limiting plate 49 which is secured to the base plate. Adjacent opposite ends of the limiting plate, are a pair of upstanding lugs 50 and 51 which are adapted to limit the travel of the actuating member. The lower lug 51 also serves as the base to which is anchored an extension 52 of a spring 53, the other arm or extension 54 of which is anchored to the actuating arm.

To operate the shutter the actuating arm is depressed or forced downwardly moving the cover plate out of aperture covering position, as shown diagrammatically in 3. Thereupon a convolute spring 55, which is pivotally attached to an arm 56 formed integral with the actuating member and secured to the shutter at 57, is positioned on and adapted to turn or rotate the shutter in a clockwise direction until its movement is interrupted by the engagement between the shoulder 44 and the stop 45. When relieved of the force by which it was depressed, the actuating arm is returned to normal position by the spring 53 to which its downward movement imparted energy. The reverse movement of the actuating arm again positions the spring 55 which in turn forces the shutter to rotate in a counter-clockwise direction until it attains its original position. Double exposure of the film exposed on the first operation of the shutter by reason of the uncovering of the aperture 39 by the shutter during its return to original position, is prevented by the cover plate 46 which covers the aperture during this period.

If the actuating arm 47 were extended through the housing of the camera and utilized as a shutter trigger, the trigger slot 59 in the housing would have to be deep enough to allow for the travel of the actuating arm and at the same time sufficiently wide to permit the actuating arm to move with the lens board on focusing of the lens. A slot of such size would aggravate the possibility of light leakage between the lens and the shutter and it is thus desirable to provide some means for limiting its size. Vertical movement of the actuating arm is necessary to operate the shutter but by pivotally mounting a trigger or release lever 60 on the base board 7, allowance for movement of the lens is unnecessary as the lens board is immovable relative to the housing. Extending between the trigger and the actuating arm is a rod 61 which is rigidly secured to the trigger and projects through a correspondingly formed hole in the actuating arm, the slidable association between the actuating arm and the rod permitting transmission of force from the trigger to the shutter without horizontal movement of the trigger. The actuating arm and trigger are preferably in axial alinement to avoid the setting up of excessive strains in the connecting rod.

As the present camera is designed to take photographs by artificial light, it is desirable to provide some means for attaching a flash light bulb to the camera and for synchronizing the flash of the bulb with the exposure of the camera. To this end there is provided a bulb or lamp socket 62 which is adapted to seat or receive a flash light bulb 63 and is mounted on a platform or shelf 64 attached to the base board. The socket, comprising a shell 65 and a contact button or pin 66 separated by insulating material, is so positioned as to project through an opening of appropriate size in the top of the housing 1. For convenience a battery or power source 67 of sufficient capacity to fire a flash light bulb can be carried in the camera, adequate space for this purpose being available in the film chamber 4 without interference with the light rays projected into the chamber by the objective. One terminal of the battery is wired directly to the shell 65 of the bulb socket. The other terminal is connected to a contact blade 68 which is adjustably attached to but insulated from the base plate 37 of the shutter mechanism in close proximity to the peripheral edge of the shutter 41. Extending outwardly from the edge of the shutter is a protrusion extension or projection 69 which is adapted to under-ride the contact blade and engage or make contact therewith on rotation of the shutter. The contact pin or button 66 is electrically connected to the base plate and on contact of the projection or contact member with the contact blade the electrical circuit is completed and a flash bulb seated or inserted in the socket ignited.

By attaching the circuit making means directly to the shutter both the exposure of the film and the ignition of the bulb are made dependent upon the operation of the shutter. It is thus a simple matter to so position the contact member and the orifice 43 on the shutter as to synchronize the exposure with the flash of the bulb, obviating the necessity of attaching complicated timing mechanism to the camera. The timing may be readily adjusted by rotating the contact blade or changing its size, thereby speeding up or retarding the ignition of the bulb relative to the uncovering of the aperture 39 by the orifice.

An important feature of the invention is the means whereby the shutter is locked against accidental operation to prevent undesired exposure of film and is operable only when a live or unfired flash bulb is seated in the socket 62. The locking means is a rocker member or bifurcated lock bar 70 pivotally associated intermediate its extremities with the base plate 37 and having a pair of downwardly extending legs 71 and 72 which are adapted to ride in the paths of members extending outwardly from the peripheral edge of the shutter. One of these members is the contact member 69, the other an extension or projection 73 which is spaced along the peripheral edge of the shutter a sufficient distance from the contact member to normally engage the inner surface of the leg 72 of the lock 70 when the shutter is in normal position. Similarly the contact member is adapted to engage the inner surface of the leg 71 on completion of the clockwise rotation of the shutter.

The lock 70 is affixed to the end of a rotatably movable rod or shaft 74 which projects through both the base plate and the lens board 11 and is slidably connected to a sleeve 75 having a collar or hub 76 which abuts the base board 7 to which the sleeve is pivotally or rotatably secured by suitable means. The shaft terminates short of the base board and is provided adjacent its inner extremity with an angularly disposed pintle or shear pin 77 which projects through and is guided by a longitudinally extending slot 78 in the sleeve for the transmission of force from the sleeve to the shaft through the range of movement of the lens board relative to the base board.

To enable the operability of the shutter to be controlled by the flash bulb the contact button 66 is preferably formed as the head of a plunger or bolt 79. The plunger extends through the platform 64 on which the bulb socket is mounted and carries below the platform a longitudinally adjustable member 80 which is adapted to abut the upper surface of a treadle plate or actuating bar 81 about an opening in the treadle through which the lower end of the plunger projects and by which its movement is guided. Adjacent one end the treadle is pivotally attached to the base board. Its other extremity is supported by a coil or helical spring 82 which is anchored to the base board. Depending from the spring-supported end of the treadle is a lip 83 which is apertured and adapted to receive and slidably engage an arm or rod 84, the latter being rigidly secured to and projecting outwardly from the hub 76.

To unlock the shutter a flash bulb is inserted in the bulb socket. The base of the bulb thereupon impinges against the head of the plunger 79 forcing the plunger downwardly and causing the treadle 81 to be depressed. The latter movement rotates the sleeve 75 by actuation of the rod 84 and through the sleeve and shaft 74 pivots the lock 70, moving the leg 72 out of engagement with the lock engaging projection 73, and releases the shutter. As the leg 72 of the lock is disengaged the other leg moves downwardly into the path of the contact member 69. Operation of the shutter causes the contact member to slide under or under-ride and abut the inner surface of the latter leg effectively preventing further operation of the shutter so long as the fired flash bulb remains seated in the bulb socket. On removal of the bulb the spring 82 raises the treadle to its normal position, causing a reverse movement of the parts of the locking mechanism and permitting the shutter to return to its original position. In course of the counter-clockwise rotation of the shutter the projection 73 slides under the corresponding leg of the rocker member or lug and the shutter is locked against movement until a bulb is again seated in the socket. The frequent engagement between the legs of the lock and the projections on the shutter makes it desirable to construct the lock of resilient material which is capable of withstanding bending movement without rupture.

To facilitate action of the locking mechanism, the lock engaging projections on the shutter are wedge-shaped, presenting their inclined surfaces to the outer surfaces of the legs of the lock, up which the latter are adapted to slide as they are under-ridden by the projections, and their perpendicular abutting surfaces to the inner surfaces of the legs in locking position. Possible injury to the shutter by impact of the legs of the lock bar against the shutter proper is prevented by providing a pair of abutting members 85 which are adapted to engage the lock bar on opposite sides of the shaft and limit pivotal movement of the bar. Within these limits, the movement of the lock bar is controlled by the movement of the adjustable member 80 on the plunger 79 by which the treadle 81 is actuated.

The spring 82 may be relieved of part of its burden of returning the parts of the locking mechanism to locked position by interposing a helical spring 86 having a pair of spaced spring caps 87 between the contact button 66 and the platform 64. This spring is adapted to retain the contact button in elevated or extended position, the limit of the upward movement being determined by the engagement between the adjustable member 80 and the undersurface of the platform 64. Constant electrical contact between the bulb seated in the socket and the contact button 66 is thus insured. It has heretofore been mentioned that the contact button is wired to the base plate 37. This can be accomplished conveniently by attaching a wire from the base plate to the lower portion of the plunger 79. If the treadle 81 is constructed of conducting material the wire to the plunger can be attached instead to the treadle. Another nut adjusting member can then be attached to the plunger below the treadle and the spring 86 utilized to return the parts of the shutter mechanism to normal position, permitting elimination of the spring 82.

Referring to the modification of the invention illustrated in Figures 9 through 12, inclusive, it will be observed that an operating mechanism of sturdier and more precise construction has been substituted for that heretofore described. The focusing and aperture controlling means of the first embodiment is here replaced by providing a base board 7a with a stationary outer tube 9a which projects rearwardly from the board and is rigidly secured thereto. Into the stationary tube and projecting outwardly of the outer face of the base board, telescopically and rotatably fits an inner or lens tube 10a in which are mounted or carried the lenses 13b and 13c of an objective 13a. Also carried by the lens tube is an iris diaphragm 28a of the usual type comprising a multiplicity of overlapping blades 88 pivotally attached at their outer ends to an inner ring 89 which slidably engages the inner surface of the lens tube. Adjacent the inner ring, the lens tube is provided with an inwardly extending flange 90 having a plurality of slots 91 in each of which is slidably received a pin 92 projecting from one of the diaphragm blades. An outer ring 93, concentric with the inner ring and slidable relative to the outer surface of the lens tube is fixedly connected to the inner ring by means extending through an appropriate slot 94 in the lens tube. To the outer ring is fixed one end of a guide rod 95, the other end of which is slidably received in a correspondingly formed opening 96 in the base board. It is thus evident that, while the diaphragm rings are capable of moving longitudinally, their rotative movement is prevented by the rod 95 and on rotation of the lens tube, the iris opening of the diaphragm will be changed by reason of the pin and slot engagement with the diaphragm blades and the flange 90.

The desired rotative movement may be imparted to the lens tube by attaching a bracket 97 to the outer face of the base board and rotatably mounting therein a shaft 98. Fixed to the inner end of the shaft is a gear 99 which is adapted to mesh with the cogs of a pinion 100. The pinion pivots on a shaft 101 projecting outwardly from the base board and its cogs are also adapted to mesh with and slidably engage the teeth of a toothed flange 102 formed on the outer periphery of the lens tube. Rotation of the shaft and, through the train of gears, the lens tube is provided for by extending the shaft so that it is adapted to project outwardly of the shell of the camera and affixing to its outer end a knurled actuating knob 103.

By forming an angularly disposed slot or aperture 104 in the lens tube in which a pin 105 projecting inwardly from the inner surface of the outer tube 92 is slidably engaged, rotation of the lens tube will produce longitudinal movement of the tube relative to the base board. It is thus possible to focus the lens simultaneously with the adjustment of its aperture by actuation of the knob 103. The correctness of the setting of the aperture relative to the focus of the lens will depend upon the pitch of the slot which is determined by the factors that governed the selection of an iris diaphragm actuating lever of proper size in the first embodiment.

The shutter mechanism and means for locking the shutter against rotation differ but slightly from those heretofore described. The method of focusing the lens in the present embodiment makes it possible to rigidly connect the base plate 37a of the shutter to the base board and is principally responsible for the difference between the two embodiments, the other changes being merely refinements in construction. It is, therefore, believed only necessary to particularly describe those parts of the mechanism which are directly affected by the rigid connection.

The only affected parts are the trigger or shutter actuating lever 60a which can now be affixed to or formed as an integral part of the shutter actuating member 47a and the lock operating mechanism. The latter comprises a rocker member or lock-bar 70a having a pair of downwardly extending legs 71a and 72a which are respectively adapted to over-ride and engage projections 69a and 73a on the rotatable shutter 41a. The lock 70a is affixed to the end of a shaft 74a which extends between and is rotatably attached to both the base board 7a and the base plate 37a. Operation of the lock on insertion of a bulb into the socket 62a is permitted by connecting a bulb actuating plunger 79a to one end of a treadle plate 81a having an integral downwardly extending boss 106 intermediate its ends which is keyed to the shaft 74a. For returning the locking mechanism to normal position, there is provided a spring 82a, one end of which is anchored to the end of the treadle plate opposite the plunger and the other to the base board.

The only other difference of any magnitude between the embodiments is in the position of the spring 53a by which the shutter actuating member is returned to normal position after rotation of the shutter, which spring is here shown as having one end anchored to the base plate and the other to the actuating member above its pivotal point 48a. Since the mode of operation of the shutter mechanism of the modification is identical with that of the first embodiment, a description of the action of the various parts of the modification is considered unnecessary.

As is customary in flashlight cameras, a reflector 107 is preferably mounted on the top of the camera in rear of the flashlight bulb. So positioned, the reflector performs the dual function of directing the light emitted from the flashlight bulb toward the object being photographed and protecting the operator of the camera from injury if a flashlight bulb should accidentally explode. It is also desirable to removably attach the bottom plate of the camera housing to the camera to permit the operating mechanism to be readily inserted in the housing and removed therefrom if repairs are necessary.

From the above detailed description of the accompanying drawings, it will be apparent that there has been provided a flashlight camera possessing certain novel features which combine to produce an effective and practically trouble-free camera. While the described embodiments of the invention have been illustrated in connection with a box camera, it will be apparent that the features of the invention are equally applicable to other forms of cameras.

Having thus described my invention what I claim and desire to secure by Letters Patent is:

1. In a flashlight camera the combination with a frame, of a normally locked shutter associated with said frame, a bulb socket mounted on said frame, contact means carried by said shutter for closing a circuit between said socket and a source of power and igniting a flashlight bulb in said socket on the operation of said shutter, and means associated with said socket for releasing said shutter to permit operation thereof on the insertion of a bulb into said socket, said last named means being adapted to engage said contact means to lock said shutter against further movement until said bulb is removed.

2. In a flashlight camera the combination with a frame, a lens, and a bulb socket carried by said frame, of a plate associated with said frame and having an opening therein for the admission of light through said lens to a film chamber within said frame, a shutter adapted to cover said opening, and means for normally locking said shutter in opening covering position, said means being actuated by the insertion of a bulb into said socket to unlock and permit the operation of said shutter and the exposure of film in said film chamber.

3. In a flashlight camera the combination with a fixed frame and a lens mount movably associated with said frame and carrying a lens, of a socket mounted on said frame and adapted to receive a flashlight bulb, a shutter carried by said lens mount, and means associated with said socket for normally locking said shutter, said means being actuated by the insertion of a bulb into said socket to release said shutter for a single operation.

4. In a flashlight camera having a film compartment, a panel closing the forward end of said compartment, and a lens mount movably associated with said panel and carrying a lens, the combination of a bulb socket mounted on said panel, a shutter carried by said lens mount, and means carried by said shutter for completing a circuit between said socket and a source of power on operation of said shutter, said means co-operating with means actuated by the insertion of a bulb into said socket to prevent further movement of said shutter until said bulb is removed from said socket.

5. Shutter mechanism for a flashlight camera having a bulb socket associated therewith, comprising a base plate, a shutter rotatably mounted on said plate, means for actuating said shutter, a rocker member associated with said plate and adapted to alternately engage spaced projections on said shutter for locking said shutter against rotation, and means associated with said bulb socket for disengaging said rocker member from said projections to permit rotation of said shutter on insertion and removal of a bulb from said socket.

OSCAR J. GOERING.